(12) United States Patent
Durant et al.

(10) Patent No.: US 7,216,780 B2
(45) Date of Patent: May 15, 2007

(54) APPLICATOR AND INTEGRATED CONCENTRATE SYSTEM

(76) Inventors: Andrew Durant, 180 N. C St., Tustin, CA (US) 92780; David Millar, No. 8 Liana, Aliso Viejo, CA (US) 92656; Steven Baranek, 2426 E. Athens Ave., Orange, CA (US) 92867

( * ) Notice: Subject to any disclaimer, the term of this patent is extended or adjusted under 35 U.S.C. 154(b) by 0 days.

(21) Appl. No.: 10/928,529

(22) Filed: Aug. 26, 2004

(65) Prior Publication Data

US 2005/0023294 A1 Feb. 3, 2005

Related U.S. Application Data

(60) Division of application No. 10/407,068, filed on Apr. 4, 2003, now Pat. No. 6,799,700, which is a continuation-in-part of application No. 10/206,722, filed on Jul. 26, 2002, now abandoned, which is a continuation-in-part of application No. 10/124,205, filed on Apr. 16, 2002, now abandoned.

(51) Int. Cl.
 *B67D 5/056* (2006.01)
(52) U.S. Cl. .................. 222/129; 222/135; 222/143; 222/321.9; 222/401
(58) Field of Classification Search ............. 222/129, 222/135, 143, 321.1, 321.7, 321.9, 401, 541.6; 239/377
 See application file for complete search history.

(56) References Cited

U.S. PATENT DOCUMENTS

| | | | |
|---|---|---|---|
| 620,728 A | * | 3/1899 | Babin ........................ 239/377 |
| 1,021,015 A | * | 3/1912 | Tarrant ...................... 239/377 |
| 1,035,407 A | * | 8/1912 | Beasley ..................... 222/129 |
| 1,312,203 A | * | 8/1919 | Picard ....................... 222/129 |
| 1,324,545 A | | 12/1919 | Eilers |
| 1,327,162 A | | 1/1920 | Knight |
| 1,702,523 A | * | 2/1929 | Schafer ..................... 239/377 |
| 3,199,739 A | | 8/1965 | Corning |
| 3,251,387 A | | 5/1966 | Shirley |
| 3,599,684 A | | 8/1971 | Elias |

(Continued)

OTHER PUBLICATIONS

Internet ref:www.ezdispensers.com/ez_2-mixer.htm (Photo advertisement).

(Continued)

*Primary Examiner*—Kevin Shaver
*Assistant Examiner*—Melvin A. Cartagena
(74) *Attorney, Agent, or Firm*—Harrington & Harrington; Curtis L. Harrington; Kathy E. Harrington

(57) ABSTRACT

Dilute chemical carrying systems include multiple embodiments of pressurizable and gravity feed reservoirs, and are provided for support and carriage of a segregated accommodation space, in some cases separately provided and in others integrally provided, for metered introduction of a concentrate into such reservoir. The structures both provide storage for concentrated chemical containers, and metered measurement while eliminating waste, make up time and minimizing contact between workers and the chemicals or nutrients in their concentrated state. Metering may be preferably provided by a pump assembly, and operational blocking of the pump assembly may be provided in separate or integrated structures. A concentrate container system enables users to recycle sealed containers to even further eliminate the necessity to directly handle concentrate.

15 Claims, 13 Drawing Sheets

U.S. PATENT DOCUMENTS

| | | |
|---|---|---|
| 3,648,933 A | 3/1972 | Grotz |
| 4,030,664 A | 6/1977 | Tisbo et al. |
| 4,546,903 A | 10/1985 | Burch |
| 4,605,136 A | 8/1986 | Debetencourt |
| 4,705,191 A | 11/1987 | Itzel et al. |
| 4,950,083 A | 8/1990 | Bavaveas |
| D320,431 S * | 10/1991 | Mattei ............... D23/212 |
| 5,054,656 A | 10/1991 | Lasner |
| 5,275,313 A | 1/1994 | Petrillo |
| 5,325,996 A | 7/1994 | Bannigan |
| 5,421,663 A | 6/1995 | Bravo |
| 6,079,361 A * | 6/2000 | Bowell et al. ............ 119/72 |
| 6,302,336 B1 * | 10/2001 | Brown et al. ............ 239/377 |
| 6,543,649 B1 | 4/2003 | Danielo et al. |
| 6,561,437 B1 * | 5/2003 | Schulman ............... 239/316 |
| 7,011,235 B2 * | 3/2006 | Pasquariello ............ 222/133 |

OTHER PUBLICATIONS

Internet ref:wysiwyg://10/http:www.ezdispensers.com/ (Photo advertisement).

* cited by examiner

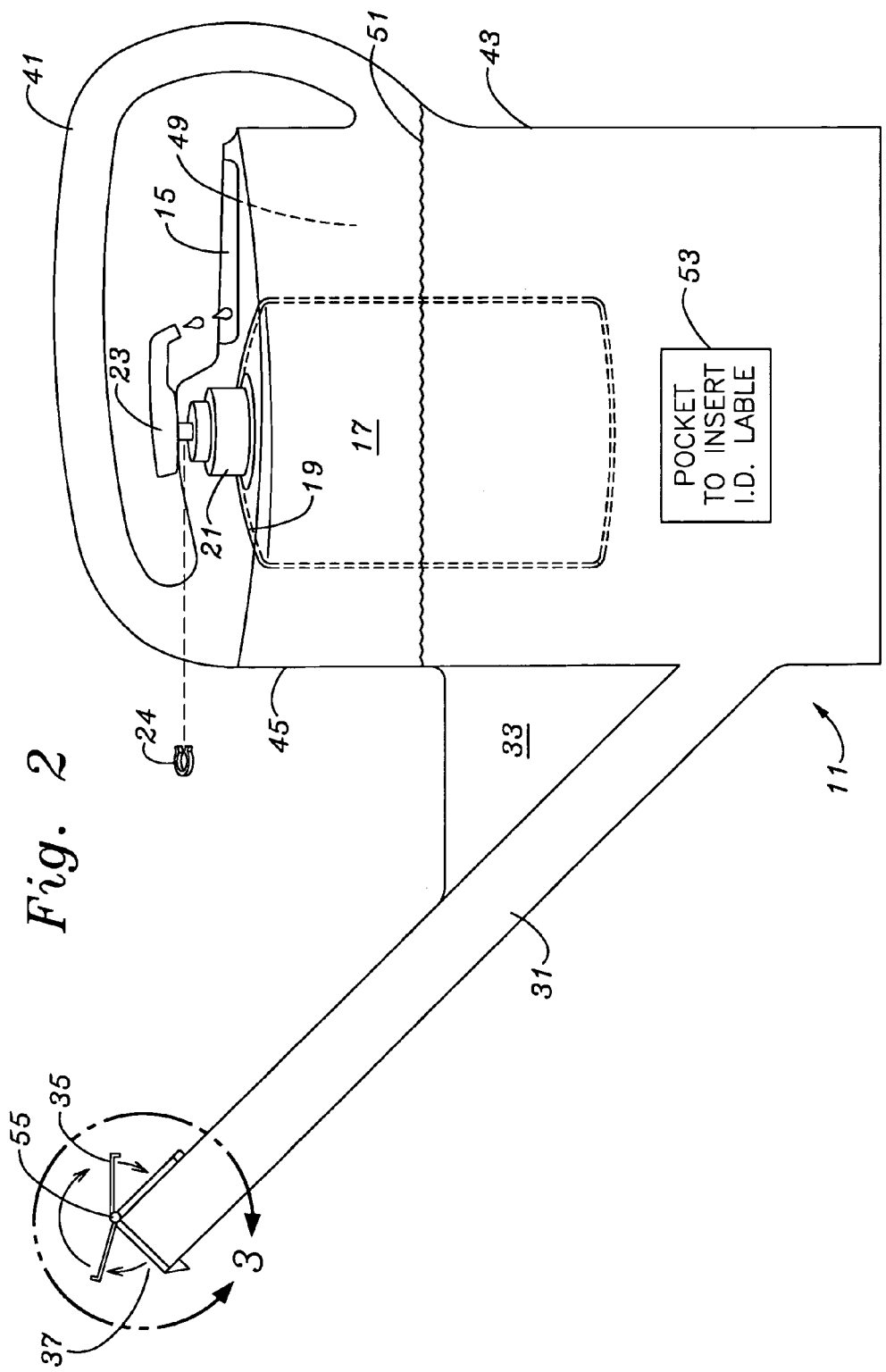

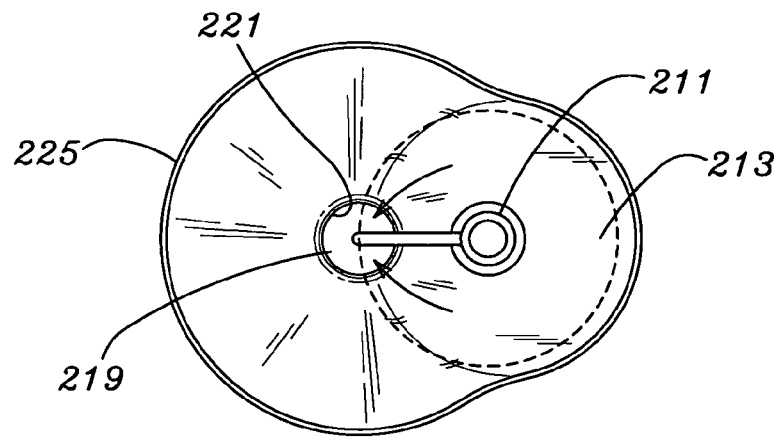
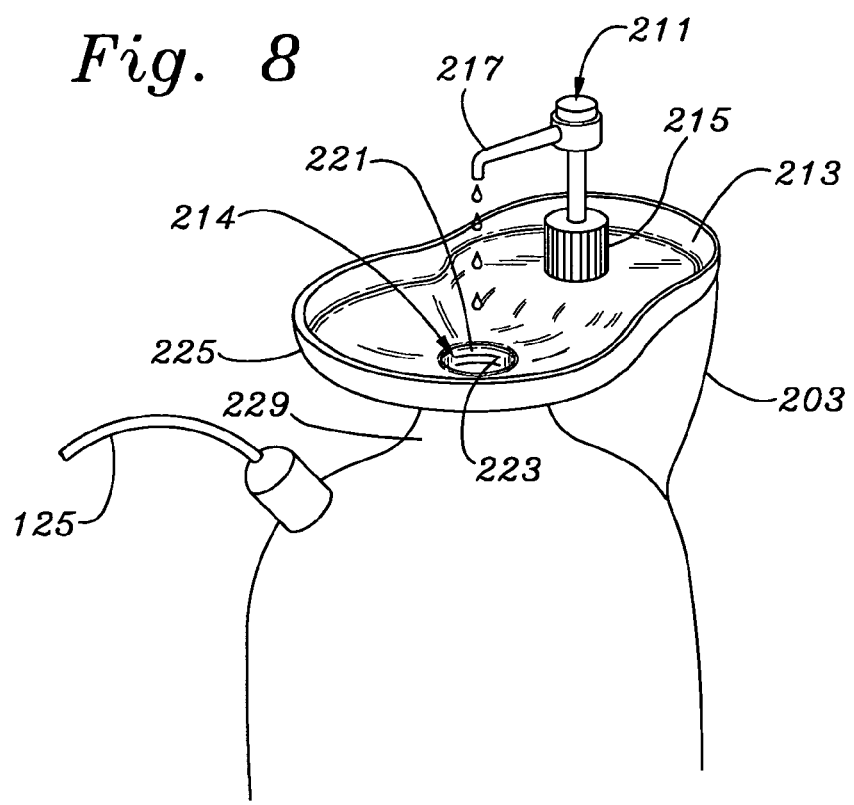

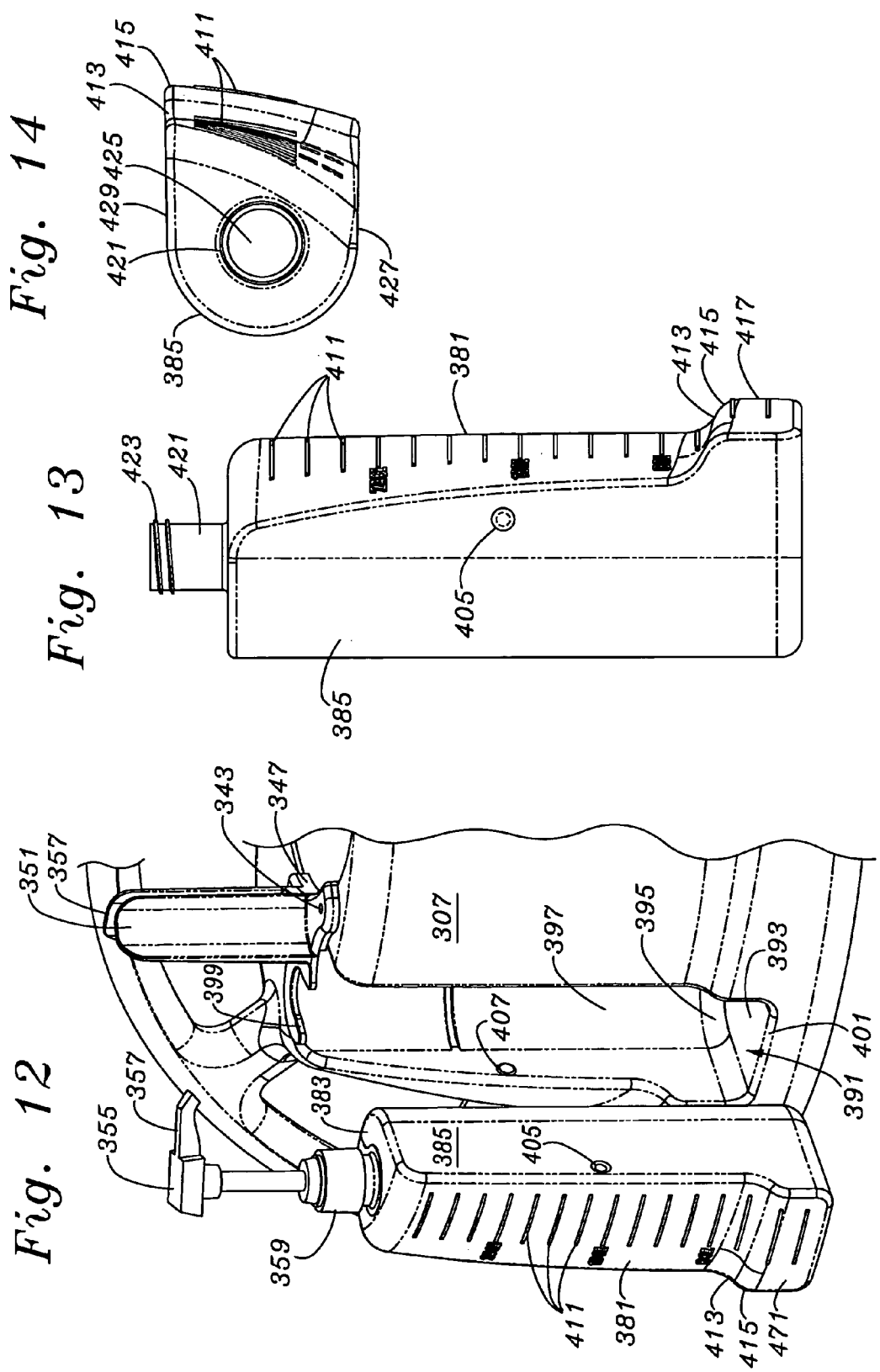

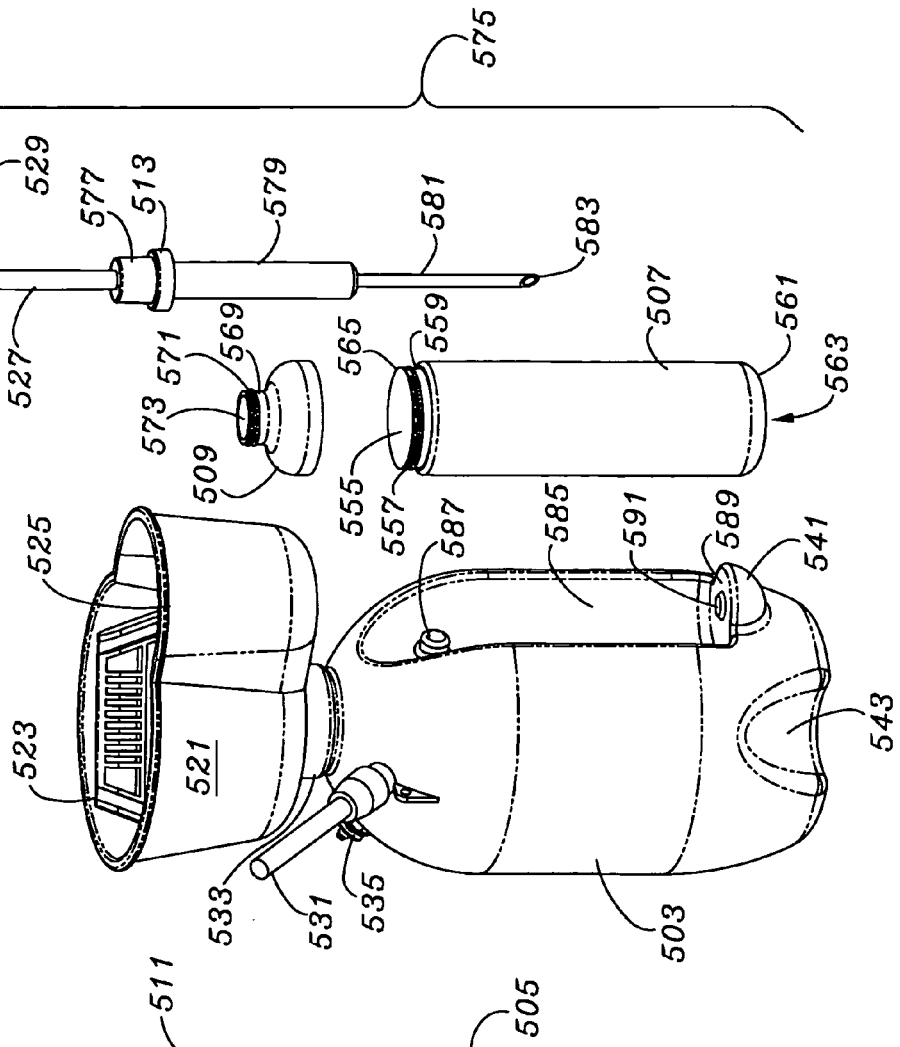
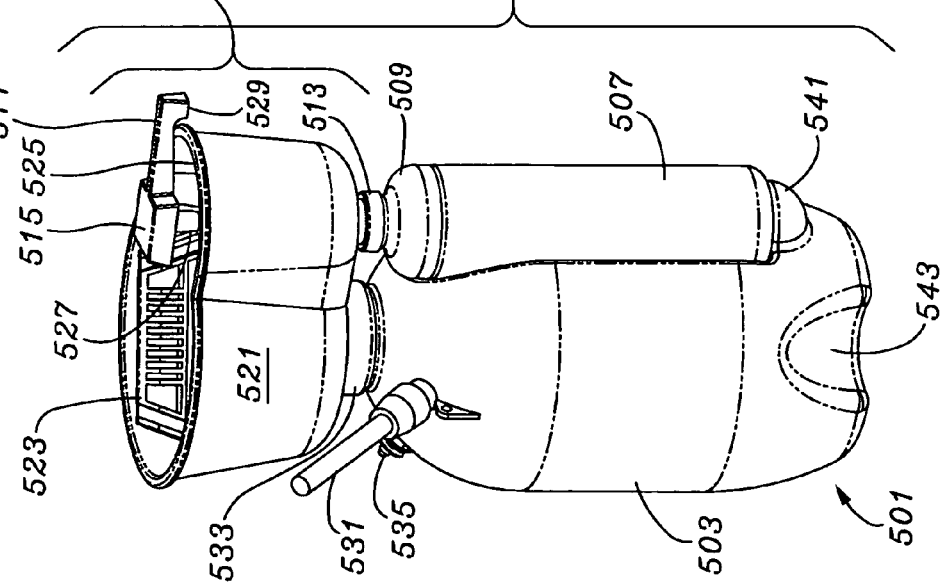

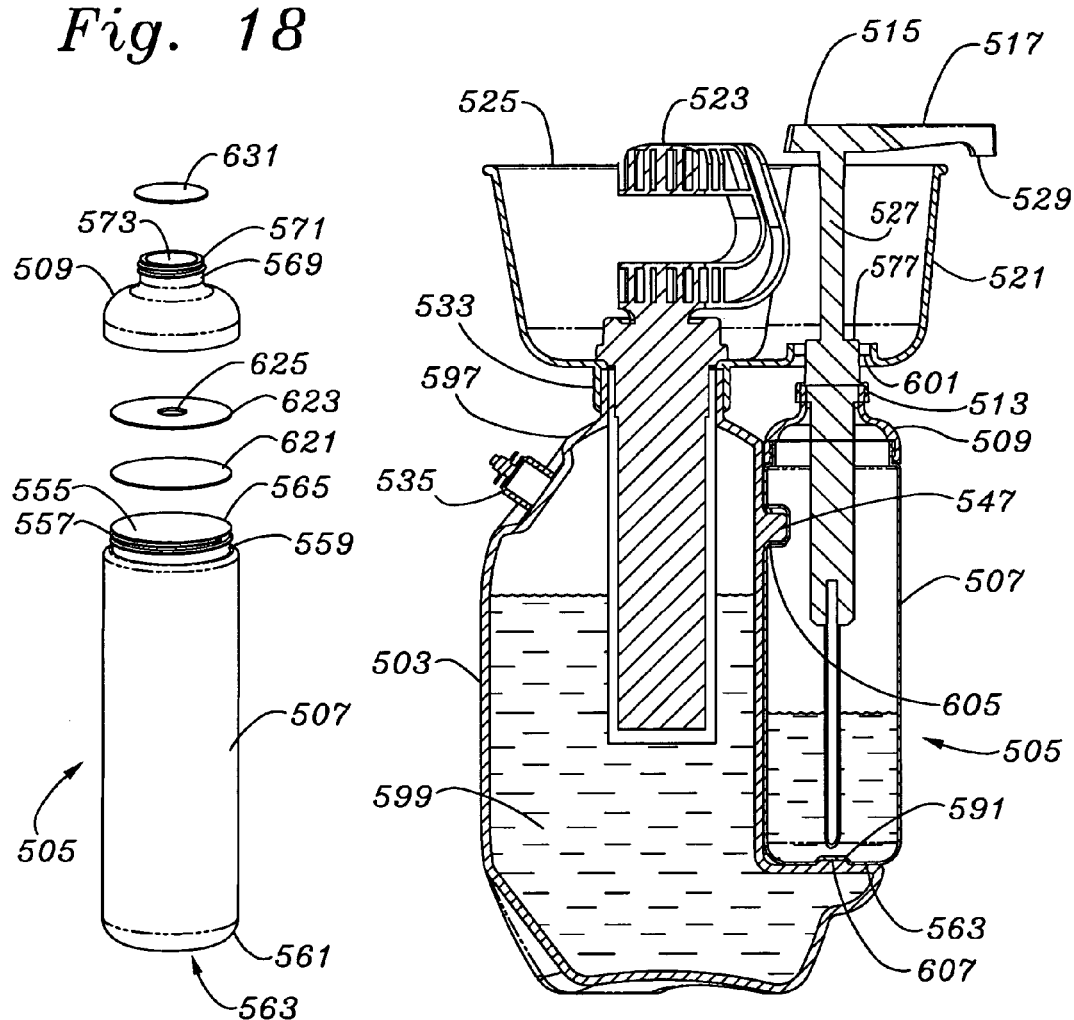

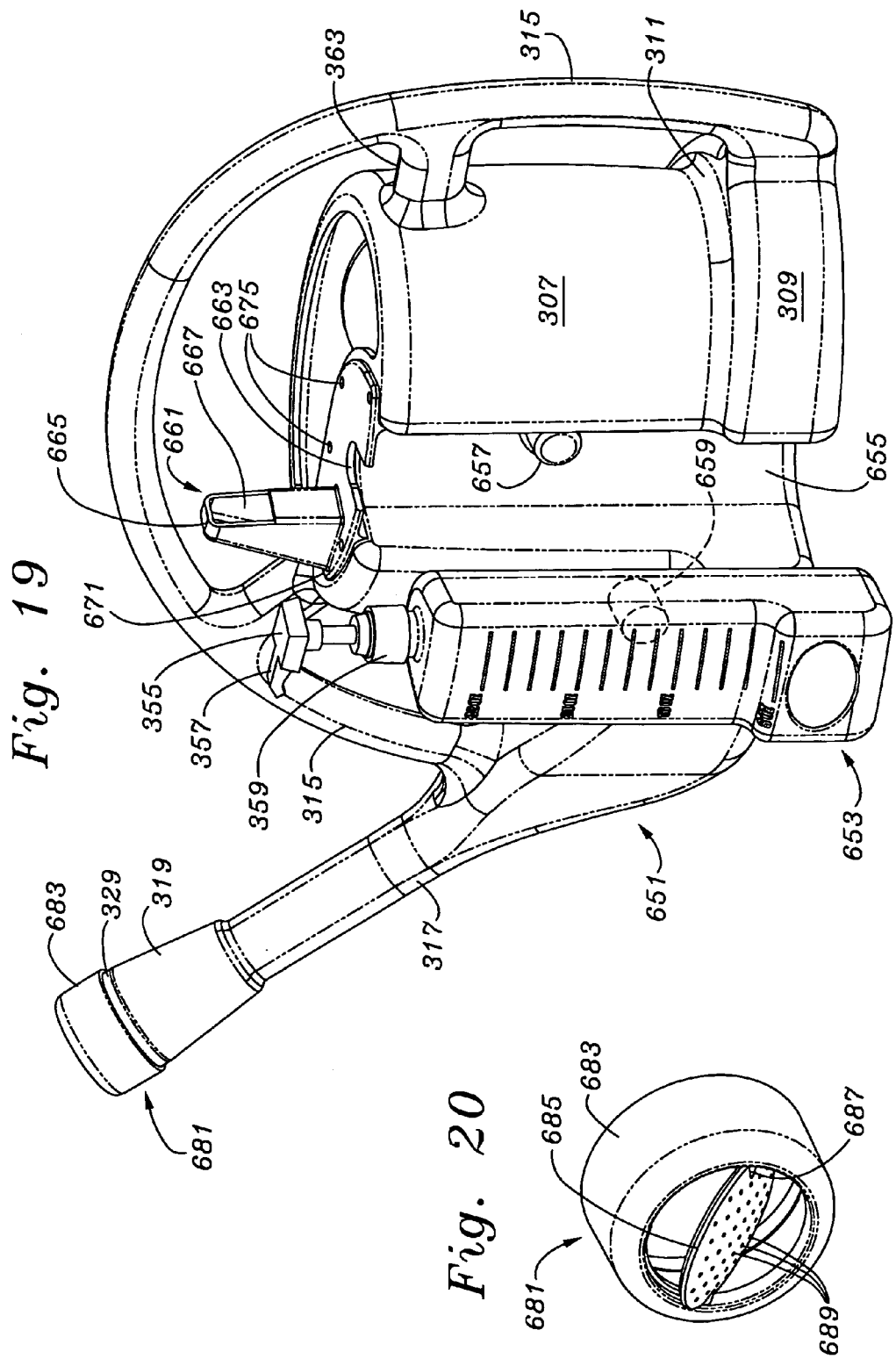

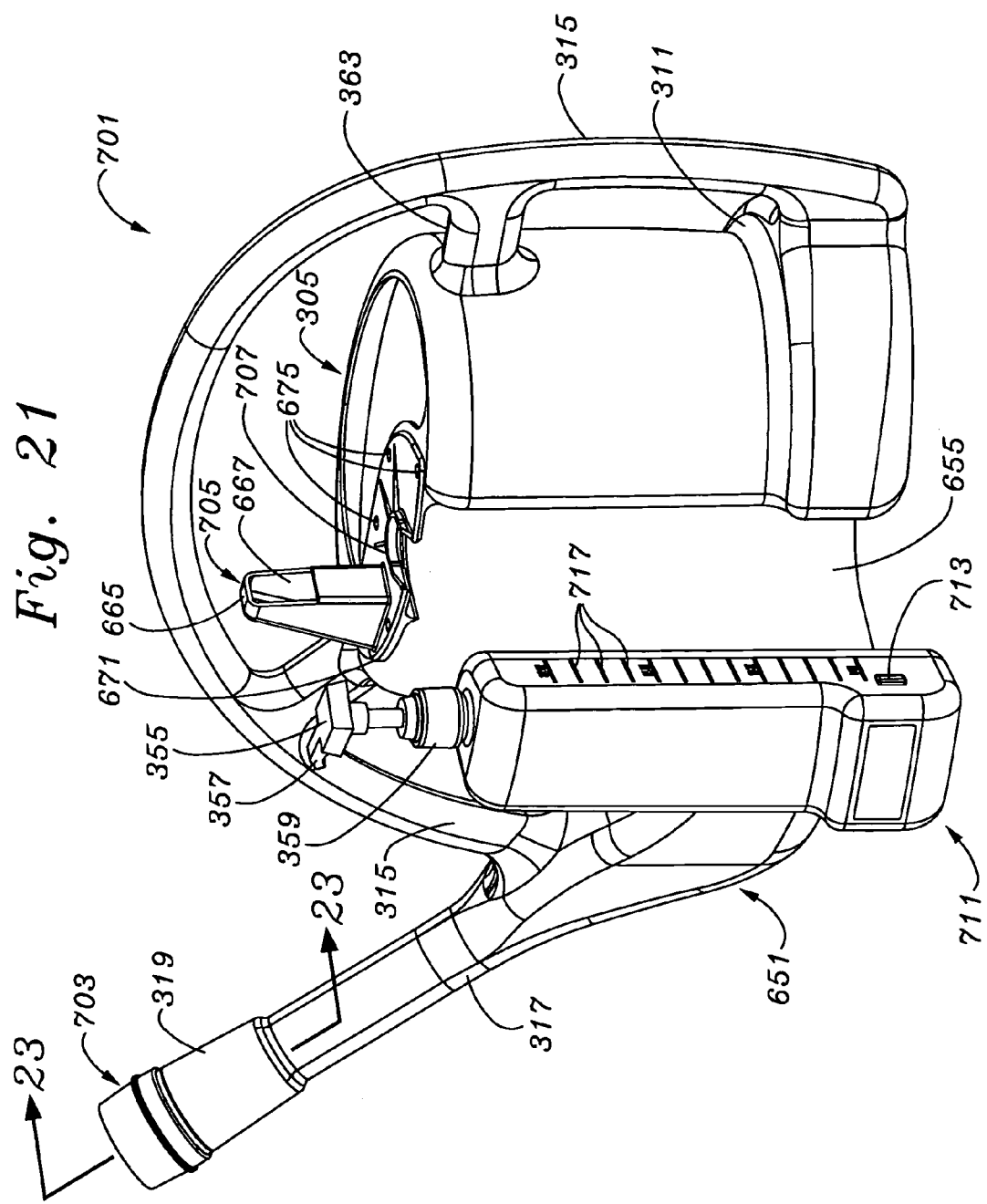

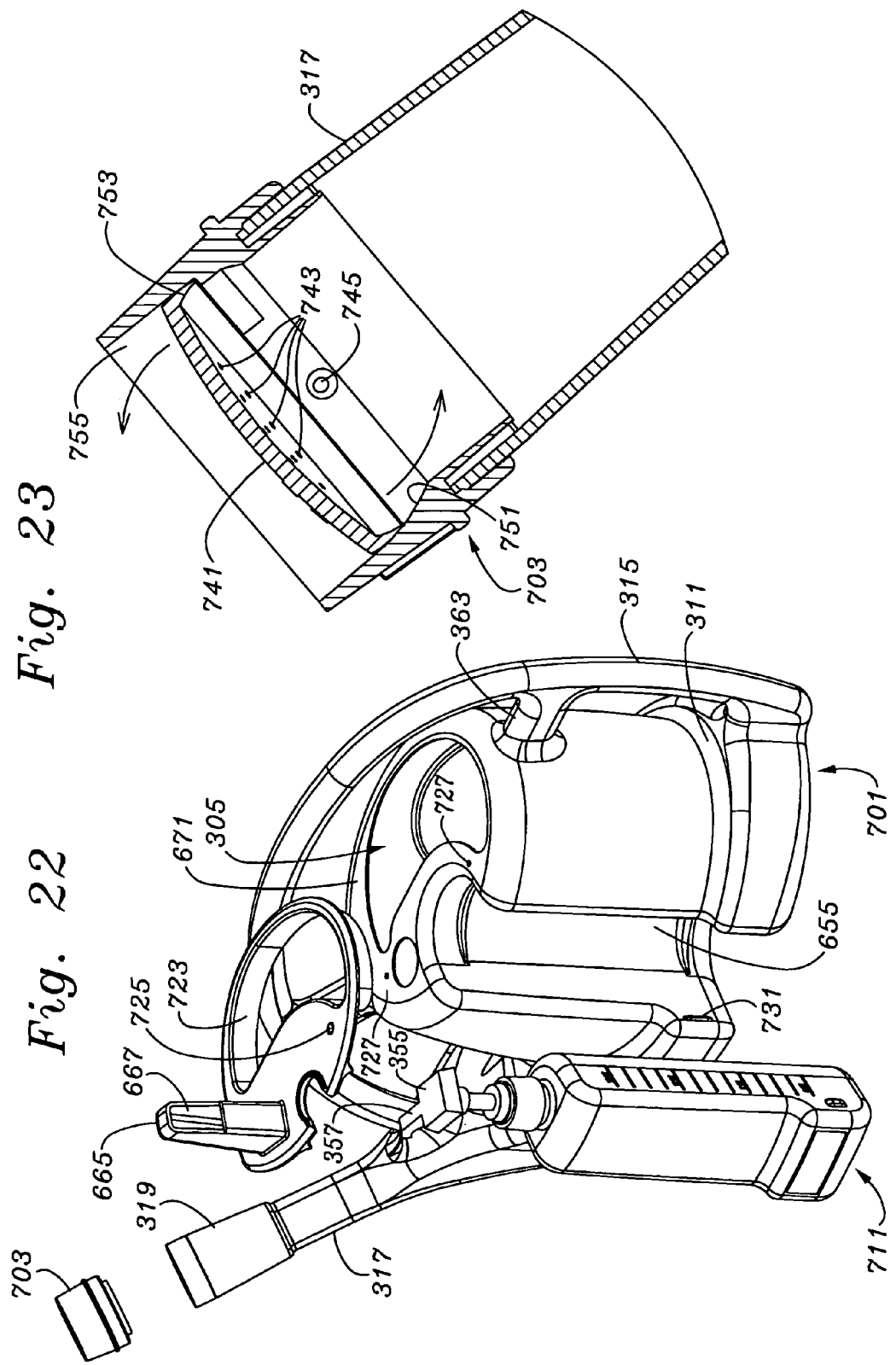

APPLICATOR AND INTEGRATED CONCENTRATE SYSTEM

This application is a divisional of U.S. Pat. No. 10/407,068 filed Apr. 4, 2003 now U.S. Pat. No. 6,799,700, which was a continuation-in-part application of U.S. Pat. No. 10/206,722 filed Jul. 26, 2002 now abandoned which is a continuation-in-part application of U.S. Pat. No. 10/124,205 filed Apr. 16, 2002 now abandoned.

FIELD OF THE INVENTION

The present invention relates to the field of chemical applicators, and more particularly to applicators operating under pressure conditions both ambient and pressurized, for the delivery of plant nutrients and treatments which are commercially available in a more concentrated form than is required at application as a dilute form of the concentrate.

BACKGROUND OF THE INVENTION

In the botanical maintenance field, workers are called upon to apply a wide variety of chemicals to flora throughout the course of a busy work day. At the worse case, a worker needs to obtain a concentrated supply of a needed chemical or nutrient, measure a given amount of the concentrated nutrient into a container, add makeup diluent, typically water, to a level necessary to make up the final concentration, and then close and put away the concentrated supply container.

In terms of time, the worker is required to take a significant amount of time in pouring, measuring, or weighing the concentrated chemical, and in retrieving, handling, and re-storing the concentrated chemical containers. Further, the process is not only wasteful in terms of time, but it is likely to be messy and produce significant spillage over a period of time. Further, where the concentrate is left at the "fill site", a number of further problems arise. Any time that concentrate is left at the job site, hose bib, or utility sink, the disadvantages multiply. Functionally it means that the user must return to the site, and that if extra time had not been taken spills contaminate the site. Secondly, leaving chemical at an additional site can lead to liability if third parties come into contact with either the containers or the spills.

Spillage creates further negative impact from lost concentrate, the waste associated with clean up from paper towels disposed of and rags which become soiled more quickly, and most importantly from the increased contact with the chemical or nutrient in its concentrated form by the worker. Many of the chemicals and nutrients are harmful to workers, especially in their concentrated state. Spillage directly onto the skin of the worker is a particularly dangerous problem, with the degree of danger dependent upon the type and concentration of the chemical in question. Carriage is also a problem. Where a worker has one or two containers of concentrated chemical or nutrient which comprises the main ones of the materials to be used throughout the day, having to separately handle the concentrated material containers in addition to the main applicators, requires additional worker attention, time and trouble. Taking up the attention of the worker when his or her attention should be directed elsewhere enhances the danger potential, especially around plants where a worker could be injured upon impact by the plant.

What is needed is a system which frees the worker from having to worry about handling and spillage, especially with regard to the concentrated chemicals and nutrients which are used most often. The needed system should include ease of dispensing and re-stocking of the concentrated chemicals to eliminate worker handling and the associated negative impact of spillage. The end result of the needed system is reduced time for measuring, mixing and diluting, and increased worker safety, as well as to promote ease of usage so as to remove the barrier for people to feed their plants regularly. The needed system should also increase the time and ease of mixing and where possible prevent inadvertent spillage of concentrated chemicals and nutrients.

SUMMARY OF THE INVENTION

The system of the present invention includes the provision of a support of accommodation space on a gravity feed watering device or on a pressurized applicator to both provide storage for concentrated chemical containers, and metered measurement while eliminating waste, make up time and minimizing contact between workers and the chemicals or nutrients in their concentrated state, and to encourage and facilitate the regular feeding of plants, by reducing the trouble and bother associated with feeding plants to increase the regularity with which plants are fed and watered. The aforementioned mechanisms hold true for both commercial workers and home plant enthusiasts, especially hobby growers. Further, the invention makes it less dangerous to bring concentrated material into sensitive areas such as hotel lobbies and restaurants, common atrium areas and similar surroundings where minimum exposure is desired. In terms of commercial workers, the invention should reduce the liability while workers are on the job site by keeping chemicals from children and by reducing or eliminating what would be a further mixing station for the concentrated chemicals.

In normal usage, concentrated chemical or nutrient containers are stored in a position near the periphery of the entrance of the device, typically a watering device or applicator. From an initial empty state, displacement dispensers atop the concentrated chemical or nutrient containers applicators are activated to meter a pre-determined amount or multiples of such amount of concentrated chemical or nutrient into an opening of the device. Typically water is then added under flowing pressure into the opening to cause the metered chemical or nutrient to become mixed upon the rapid gravity introduction of the water or other mixture forming liquid.

Structure may be provided to prevent further concentrated chemical or nutrient from being dispensed and may include structure on the general device which blocks metering of the concentrated chemical or nutrient, or blocking members may be placed directly on the concentrated chemical or nutrient containers, or upon structure connected with the main applicator housing which supports the concentrated chemical or nutrient containers. In the alternative, a raised concentrate reservoir may be combined with a catch bib to insure that all chemical is either dispensed directly into the reservoir or collected in the bib for drainage into the main reservoir.

The manner of integration of the concentrated chemical or nutrient containers into the main applicator can be controlled in accord with shape to achieve important objectives. These objectives may include permitting or encouraging the use of generally compatible chemicals by integrating the container sizes to fit within a provided space. Chemicals which should never be used together can be placed in containers which will not physically fit within the support space, for example.

Container support and holding spaces may be configured to secure shapes and designs which are in existence or which may be in existence. In some cases, the size of the accommodated containers may be 7.5 inches, 8.5 inches, to 10.5 inches tall. The accommodated containers may be round or cylindrical or triangular or curved edge rectangular. The typical major width dimension may be 3.5 inches, 4 inches 4.5 inches or 5.0 inches. A typical minor width dimension may be 1.5 inches, 2.0 inches to 2.5 inches. The volume of the liquid containers may be from eight ounces to sixteen ounces to almost 40 ounces.

It is also contemplated that the applicator devices have support spaces which may specifically match with a concentrated chemical or nutrient container and in which the overall capacity of the applicator structure matches with the volume of concentrated chemical or nutrient metering capability of the concentrated chemical or nutrient containers. This opens further the ability to match concentrate containers with applicators. In some cases the accommodation space can be maximized to, in essence, provide an applicator with expanded concentrate containers. This in turn can enhance the use of applicators which are built around a single or even two or three concentrate containers.

BRIEF DESCRIPTION OF THE DRAWINGS

The invention, its configuration, construction, and operation will be best further described in the following detailed description, taken in conjunction with the accompanying drawings in which:

FIG. 2 is a side view of the gravity operated applicator illustrated in FIG. 1 showing its operation handle and more of the vertical detail of physical location of a first container and orientation of its pump applicator and spout extension;

FIG. 8 illustrates a further embodiment in which an integral concentrate reservoir is mounted higher than the entrance to the main pressure chamber;

FIG. 9 is a top view of the embodiment of FIG. 8 and illustrating the flow path of material;

FIG. 12 is a partial view of the second embodiment of a gravity type applicator as seen in FIGS. 9 and 10 from a perspective similar to that seen in FIG. 10, but with the integral concentrate container shown separated and apart from the applicator;

FIG. 13 is a side view of the integral concentrate container seen in FIGS. 10–12;

FIG. 14 is a top view of the integral concentrate container seen in FIGS. 10–13;

FIG. 15 is a perspective view of a further embodiment of a more specialized pressurizable applicator container with a top mounted spillage prevention system mounted over an integrally mountable concentrated chemical or nutrient container;

FIG. 16 is an exploded view illustrating the applicator apart from a concentrate system including a cylindrical container, top adapter and pump assembly;

FIG. 17 is a cross sectional view of the applicator of FIGS. 15 and 16;

FIG. 18 is an exploded view of a cylindrically shaped concentrate supply container system;

FIG. 19 is a perspective view of a further embodiment of a gravity type applicator, again with the integral concentrate container shown separated and apart from the applicator;

FIG. 20 is a sectional view of the sprinkle screen;

FIG. 21 is a further embodiment of a gravity type applicator, with a modified upper reinforcement member and ramp style concentrate bottle holding mechanism;

FIG. 22 is a perspective view of a gravity type applicator with a modified upper reinforcement member having a downwardly directed flange for fitting within the top opening; and FIG. 23 is a side sectional view taken along line 23—23 of FIG. 21 and showing internal details of the recessed sprinkle screen assembly seen in FIGS. 21 and 22.

DETAILED DESCRIPTION OF THE PREFERRED EMBODIMENT

Figure 1:
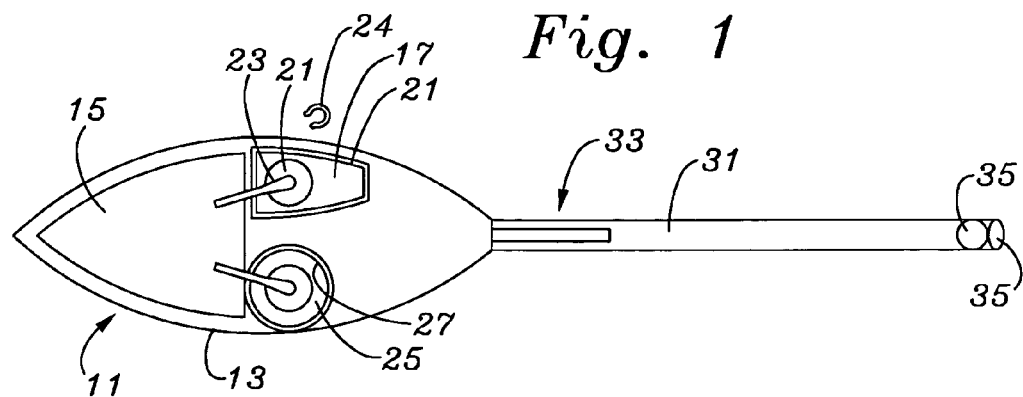
FIG. 1 is a top view of a gravity operated applicator utilizing container accommodation spaces securing matching shaped containers having dispensing mechanisms located adjacent a central opening in the applicator.

The description and operation of the invention will be best initiated with reference to FIG. 1 which illustrates a top view of a gravity type applicator 11. The gravity type applicator 11 has a housing 13 having a central opening 15, shown larger than it might normally be provided for emphasis, to show common access by a first container 17 within a first container accommodation space 19. Other structure may be provided for stabilizing the first container 17 within its container accommodation space 19, however where the first container 17 is largely surrounded and supported, further structure is likely not necessary. First container 17 is typically filled with a plant nutrient or chemical and may include a pesticide, herbicide, nitrogen food or any concentrated chemical, typically in the liquid state. Container 17 has, from an upper perspective looking downward, a trapezoidal shape, or somewhat truncated triangular shape, and includes a pump applicator assembly 21 with a spout extension 23 which preferably extends over central opening 15 to allow for ease and secure gravitational deposition of dispensed liquids from container 17 and into a main reservoir of the gravity type applicator 11 and in which mixing may occur. An optional "c" shaped locking clip 24 may be provided to lock the spout extension 23 in an up position, to prevent further dispensing of the concentrate, and such clip 24 may be attached loosely to the pump applicator assembly 21. The central opening 15 can be smaller so long as the extension 23 can gravitationally extend over it enough to reliably deposit a desired amount of concentrated material.

Further, it is preferable that the pump applicator assembly 21 have a known or pre-determined metering capability, typically in terms of ab even number of full stroke vertical pump shaft displacements to enable accurate metering of the nutrient or other chemical through the central opening 13.

This arrangement enables the user to take the guess work out of measurements and to reduce the reservoir replenishment steps to two, namely operating the pump applicator assembly 21 followed by the introduction of solvent, carrier or other effluent, typically water, into the reservoir connected to the central opening 15.

Note that the first container accommodation space 19 registers the orientation of the first container 17 and insures that the first container 17 must be inserted in a way in which the pump applicator assembly 21 must be closest to the central opening 15. Despite this physical ordering, the spout extension 23 still needs to be directed over the central opening 15. If the spout extension 23 is ordered with respect to the first container 17, either directly as by an upwardly extending boss which permits the spout extension 23 to be depressed only when the spout extension 23 is over the central opening; or by registration from the first container 17, through the pump applicator assembly 21 and thence to the spout extension 23, it can be seen that a mechanical scheme can be employed to prevent the pump operation when the spout extension 23 is in a position other than directly over the central opening 15. Such a scheme can further help to prevent spillage and also prevent unwanted or inadvertent actuation of the pump mechanisms. In other words, during times when liquid from the first container 17 is not being metered into the central opening 15, the turning of the spout extension 23 can provide a lockout mechanism.

Also seen is a second container 25 within a second container accommodation space 27. The shape of both the second container 25 and the a second container accommodation space 27 are both round or cylindrical which is likely not to afford registration through the second container accommodation space 27 and second container 25. However, registration may be made through a structure extending from the applicator 11 housing 13, which is not seen in FIG. 1 for clarity of illustration.

Other structures seen in FIG. 1 include a flow tube 31 and an angle brace 33 between flow tube 31 and the main housing 13. At the end of the flow tube 31, a strainer or flow disperser 35 is pivotally mounted adjacent an open end 37 to enable flow dispersion and also to limit the flow to a convenient rate. Pivotal attachment enables the flow disperser 35 to be selectively utilized and possibly interchanged with other flow dispersers 35 having greater and lesser aperture areas. The top view of FIG. 1 omits any handle structure over the top of the applicator 11 so that the structures can be shown with greater clarity.

Referring to FIG. 2, a side view of applicator 11 illustrates an integral handle 41 which extends from a rear side 43 of the gravity type applicator 11, upward and over the central opening 15 and toward a portion of the top of the gravity type applicator 11 near a front side 45. From the view seen in FIG. 2, the view of first container 17 is most prominently seen. The first container accommodation space 19 is shown as an opening and pocket which allows the first container to take up or displace space within the reservoir 49 which may include a water level 51. The degree to which the first container accommodation space 19 "invades" the reservoir 49 area will depend upon the size and configuration of reservoir 49 needed and the ability of one or more of the first and second containers 17 and 25 to either invade the space of the reservoir 49 or to become extended outboard of the applicator 11.

Also seen in FIG. 2 is a pocket area 53 for insertion of an information placard which may include information on one or more of the concentrated chemicals or nutrients within first and second containers 17 and 25, or relating to the use of gravity type applicator 11 in its expected mode of use. The physical structure of the pocket area 53 may include an attachable pocket onto a flat surface or a depressed surface within which a label may be attached.

FIG. 2 also illustrates the action of the flow disperser 35 and its pivoting connection 55 onto the flow tube 31. As can be seen, the flow disperser 35 can be pivoted out of the way into a storage position or into place over the open end 37. The user controls the position of the flow disperser 35 at will and the use of flow disperser 35, especially depending upon which types of plant application is to be had such as a bulk application at the base or a sprinkling application at top.

Figure 4:
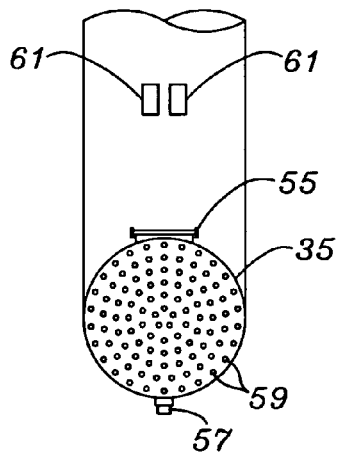
FIG. 4 is a view taken along line 4—4 of FIG. 3 and illustrating the flow disperser in a position covering the flow tube to which it is mounted.
Figure 3:
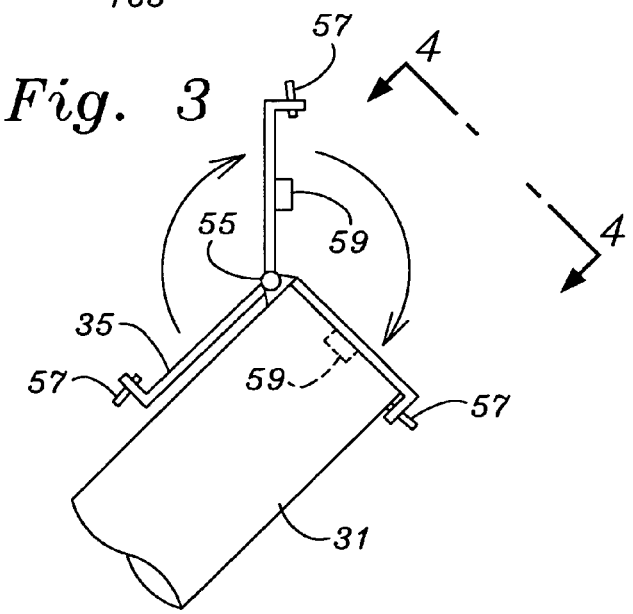
FIG. 3 is a view taken along line 3 of FIG. 2 and illustrating the overall action of a pivotally attached flow disperser structure.

Referring to FIG. 3, a closeup view taken along line 3 of FIG. 2 illustrates further details and including further details of operation. Flow disperser 35, seen from side view, may have a catch 57 and a pair of spaced apart centering lugs 59 which may engage the inside edges of the flow tube 31. Referring to FIG. 4, a view taken along line 4—4 of FIG. 3 illustrates a view looking onto the flow disperser 35 when it is in closed position. As can be seen, the flow disperser 35 has an array of apertures 59 to admit and disperse liquid from the flow tube 31. Also seen are a pair of holder structures 61 which are used to engaged the catch 57 when the flow disperser 35 is desired to be fixed in an out-of-the-way upper position.

Figure 5:
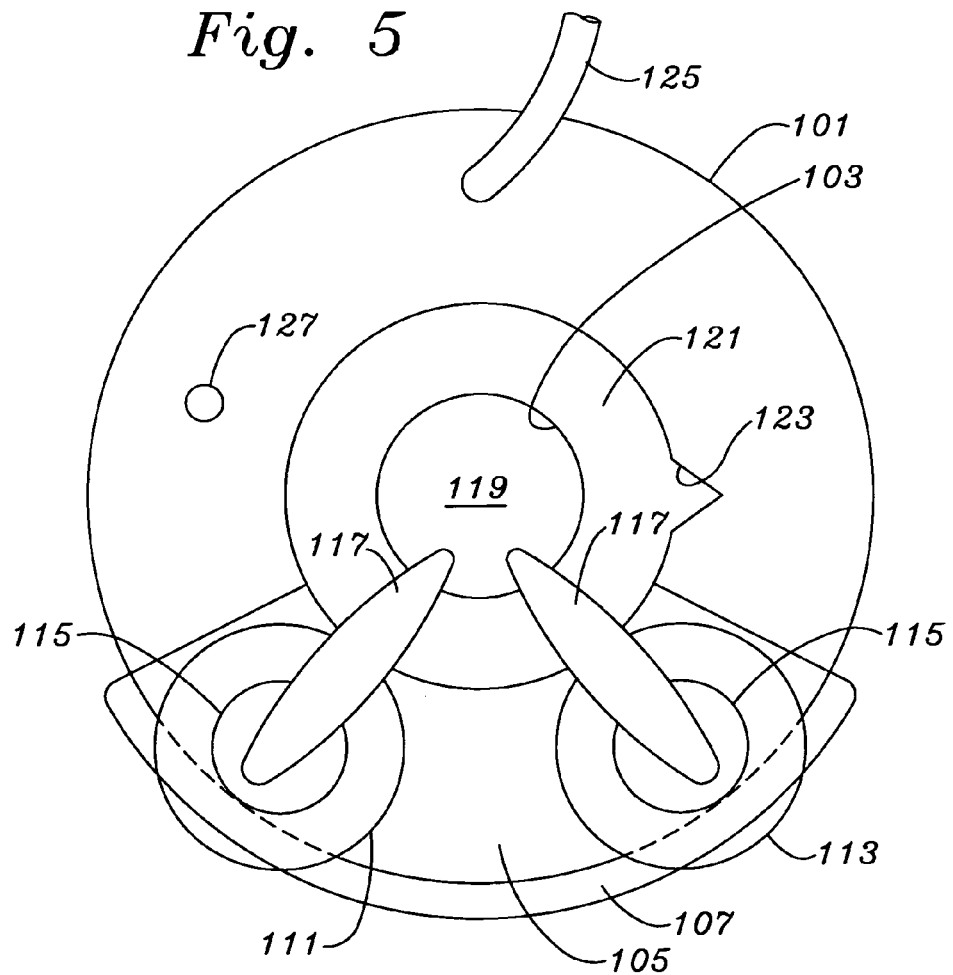
FIG. 5 is a top view of a two container arrangement mounted around a pressurizable applicator container.

Referring to FIG. 5, a top view of a pressurizable applicator 101 typically includes a relatively thick, pressurizable body with a central opening 103 which may be threaded for facilitating attachment with a pump unit (not shown). A curved opening 105 may include an upper rail 107 for supporting several individual concentrated chemical or nutrient containers, such as a first concentrate container 111 or a second concentrate container 113. Each of the first and second concentrate containers 111 and 113 includes a pump assembly 115 having a spout extension 117. The ends of the spout extensions extend over the opening 103 to enable concentrate from the containers 111 and 113 to be dispensed directly into the opening 103 which leads to the reservoir 119. The upper portion of the pressurizable applicator 101 may have a drain off collar 121 and spout 123 to assist in transfer of any dilute solution which must be removed at the time of cleaning of the pressurizable applicator 101.

Pressurizable applicator 101 is preferably fitted with a hose 125 which is typically in constant communication with the reservoir into which the opening 103 leads. In many pressurized sprayers, the entire reservoir is pressurized while flow control is effected with a wand mounted at the end of a hose, and the pressurizable applicator 101 is shown in this type of configuration. A pressure release valve 127 for venting pressure to enable the pumping unit (not shown) to be removed from the pressurizable applicator 101 without having to expel the liquid from the reservoir 119.

Figure 6:
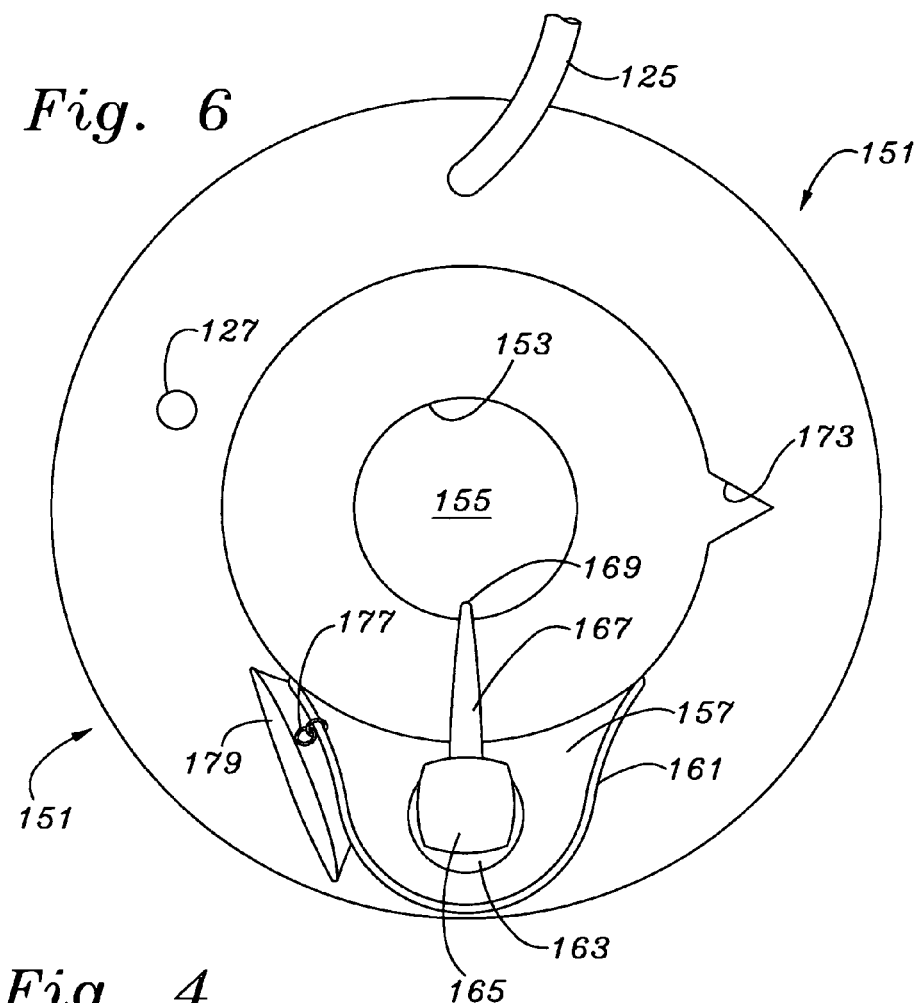
FIG. 6 is a more specialized pressurizable applicator container with an integrated concentrated chemical or nutrient container, especially useful where chemical mixing or specialized makeup metering is necessary.

Referring to FIG. 6, a top view of an integrated pressurizable applicator 151 typically includes a relatively thick, pressurizable body with a central opening 153 leading to a reservoir 155. The central opening 153 may be threaded for facilitating attachment with a pump unit (not shown). A curved area 157 identifies a liquid concentrate reservoir general area which is built into the body of the integrated pressurizable applicator 151. A blocking rail 161 is placed to cooperate with a pump assembly 163 having a pump depression handle 165 and extended spout 167 having a tip end 169 positioned over the reservoir 155. When in an upward position, as when the pump depression handle 165 is unactuated and in the upper position, the extended spout 167 is above the level of the blocking rail 161. As such, if the extended spout 167, which typically can turn 360° as in most pump assemblies including 163 is directed to any position other than a position where the tip end 169 is over the reservoir 155 or a drain off collar 171 seen adjacent the spout 173, the pump assembly 163 cannot be actuated. Also seen is a short link chain 177 connected to the blocking rail 161 and also connected to a funnel 179. Where the area 157 as an area for holding concentrate is integrated with the applicator 151, a funnel 179 will help reduce spillage. Also seen are structures previously seen in FIG. 5, including a hose 125 and release valve 127.

Figure 7:
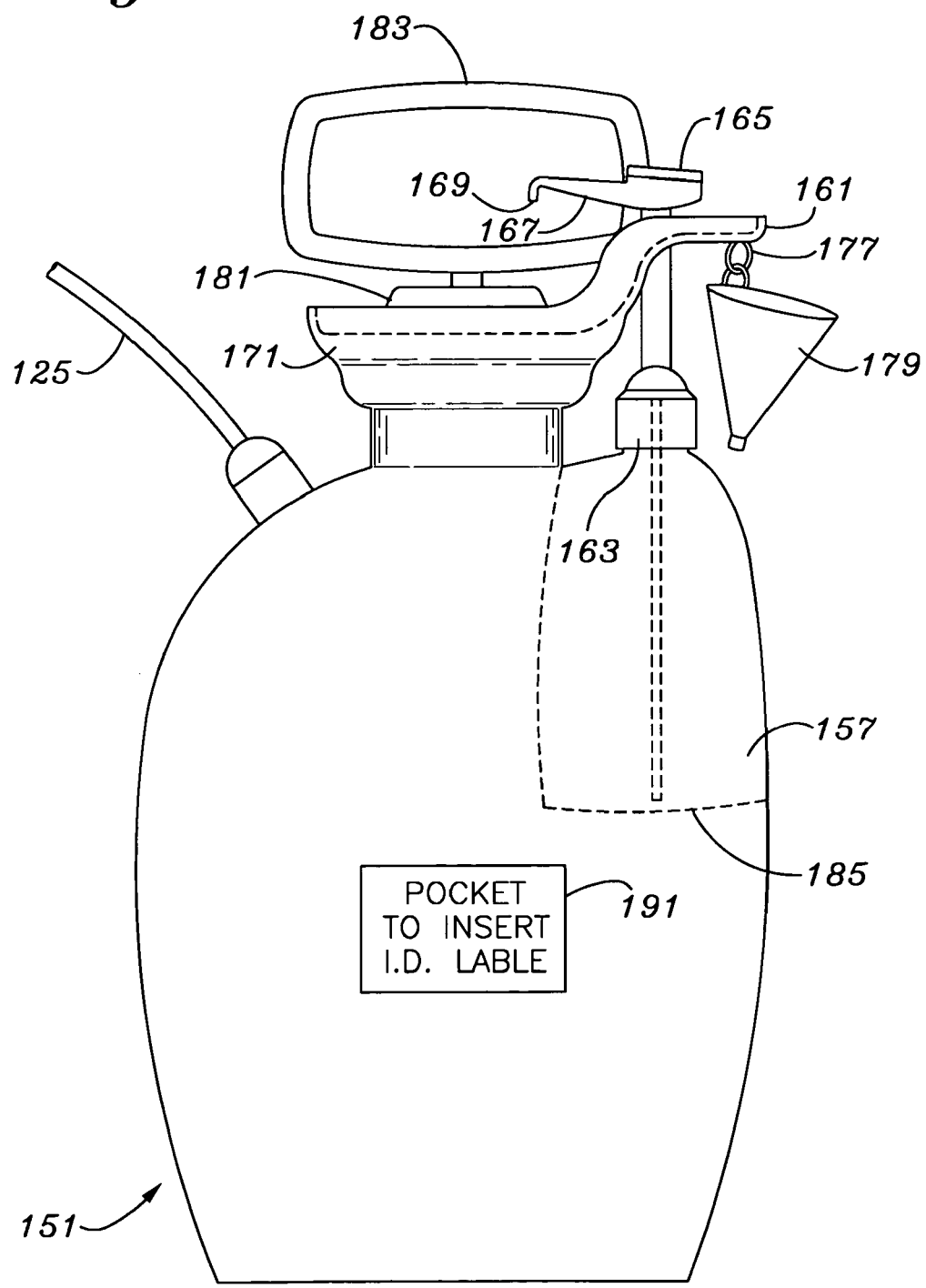
FIG. 7 is a side view of the more specialized pressurizable applicator container seen in FIG. 6.

Referring to FIG. 7, a side view of the integrated pressurizable applicator 151 is shown with a pumping unit 181 having a prominent handle 183. Typically the handle 183 can be locked with respect to the pumping unit 181 to permit the handle 183 to be utilized to carry the whole integrated pressurizable applicator unit 151. It is also seen more clearly that the blocking rail 161 is an extension of the drain off collar 171.

The area seen as curved area 157 in FIG. 6 is in fact an internally segregated reservoir area 157 now seen I FIG. 7. The dashed barrier line 185 shows the boundary of the internal concentrate reservoir generally represented by the area 157. Barrier 185 provides a physical segregation between an internal segregated area for holding concentrated chemicals or nutrients which are fed through an opening over which the pump assembly 163 is secured. The shape of the actual area of the concentrate holding volume will depend upon the shape and needs for the internal pressurizable reservoir 155. As can be seen in FIG. 7, where the extended spout 167 is swung to the right and over the blocking rail 161 that it cannot be depressed. The funnel 179 is mounted in a manner that it will not be lost and in a position where it can be brought over to an opening which is underneath the pump assembly 163, once the pump assembly 163 is removed to expose the opening into the area 157 occupied by the concentrate reservoir. Also shown is a pocket area 191 for placing instructions or labels onto the applicator 151. It is understood that the blocking rail 161 could be provided from the pump assembly 163 so long as the cap portion of pump assembly 163 is registerable with respect to the orientation of the central opening 153.

Referring to FIG. 8, a perspective view of an integrated pressurizable applicator 201 is shown as having an integral reservoir 203 mounted high upon what would otherwise be a continuation of a shoulder 205 of the integrated pressurizable applicator 201. The high mounting of the integral reservoir 203 enables a gravity safety system in lieu of the pump lockout mechanism seen in FIG. 7. Rather than disable the operation of a pump unit 211, a contoured gravity bib 213 is seen immediately surrounding a cap 215. Regardless of the position of a spout 217, any concentrate will flow into a reservoir 219. When the spout 217 is positioned directly over the reservoir 219, the concentrate drops directly into the reservoir 219. When the spout 217 is positioned elsewhere, any concentrate will flow onto the contoured gravity bib 213 and then into the reservoir 219. Upon reaching the filling with solute step, solute can be caused to run along the contoured gravity bib 213 in order to wash it off, but with any excess concentrate going directly into the reservoir 219.

As before, a hose 125 is seen, and also seen are threads 221 at the opening 223 which is again shown with a drain off collar 225. Further, the degree of integration of the integral reservoir 203 to the applicator 201 main body 227 will depend upon both convenience and need. In the alternative, the contoured gravity bib 213 and drain off collar 225 could be made as a removable unit for attachment about a neck 229 of applicator 201 where it is desired to have a quick change complete applicator set.

Figure 10:
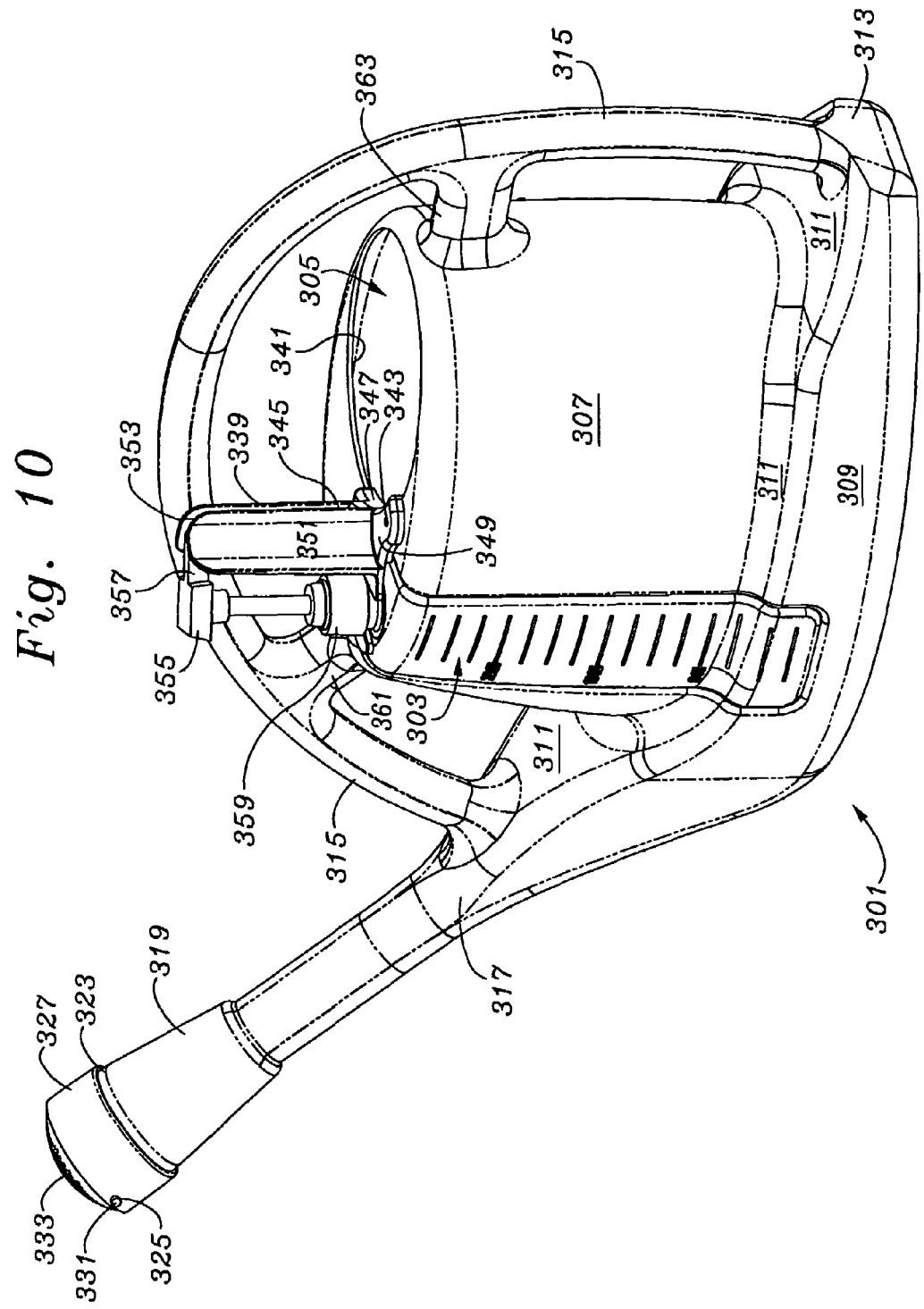
FIG. 10 is a left rear perspective view of a second embodiment of a gravity type applicator with integral concentrate container.

Referring to FIG. 10, a left rear perspective view of a second embodiment of a gravity type applicator 301 includes an integral concentrate container 303. The integral concentrate container 303 has a more gentle curve on the outside surface seen in FIG. 10, and a curved rear and bottom sides which fit into an accommodation space, not completely shown in FIG. 10 because it is occupied by the interfitting integral concentrate container 303.

One aspect of the invention is the ability to provide a wide variety of integral concentrate containers 303 of different colors especially where any sort of applicator in this application is utilized. This will enable personnel, especially un-skilled worker personnel, to more easily keep up with the proper ones of the integral concentrate containers 303 to be used. The integral concentrate containers 303 may preferably be made of clear or light dispersive plastic which transmits enough light to show the liquid level inside. A tag may be used, especially which attaches onto a neck of integral concentrate container 303 which shows specific information including concentration, warnings, or special instructions, including instructions on dispensing the concentrate.

Most of the extent of the gravity type applicator 301, with the exception of the integral concentrate container 303 forms a reservoir for being filled with plant nutrient solution typically predominantly including water. The gravity type applicator 301 is predominantly hollow having a large top opening 305 leading into an upper reservoir portion 307 which sits above an expanded base reservoir portion 309. The expanded base reservoir portion 309 provides a wider and longer base which stabilizes the gravity type applicator 301 to reduce the chances of spilling even when the gravity type applicator 301 is inadvertently bumped or struck from a position near an upper portion of its structure. A stepped dividing zone 311 between the upper reservoir portion 307 and an expanded base reservoir portion 309 is a slanted shelf which extends from the front to the back of the gravity type applicator 301. The shelf nature of the dividing zone 311 becomes a more steeply defined transition at the mid extent of the applicator 301. At the rear extent, the dividing zone 311 forms its most horizontal shelf extent and meets a heel portion 313 near the junction of an arched handle 315. This area provides a hand hold to facilitate plant feeding while the gravity type applicator 301 is raised over the user's head, the user typically grasping the rear heel portion 313 with the user's hand with the user's fingers placed aside either side of the arched handle 315 at the stepped dividing zone 311.

The base reservoir portion 309 curves gently upward toward the front of the gravity type applicator 301 to provide some forward loading when the applicator 301 is tilted forward. This feature is combined with the arched handle 315 which extends from the heel portion 313, across the top of the large top opening 305 and forward to the forward most end of the unified dividing zone 311 which forms the base of a spout portion 317. The area immediately below the forward end of the arched handle 315 is an upwardly tilted portion of the expanded base reservoir portion 309 underneath the more flattened upwardly disposed forward portion of the dividing zone 311. This has the effect of extending the expanded base reservoir portion 309 forward to both shift the center of gravity forward upon tilting, and also to move the bulk of the liquid away from the large opening 305 when the applicator 301 is tilted. This enables the user to worry less about spilling, even when the applicator 301 is nearly full and tilted significantly.

The spout portion 317 extends to an expansion fitting 319 and then to a cylindrical portion 323 which may support optional engagement with a sprinkle screen assembly 325. The sprinkle screen assembly 325 includes a cylindrical body portion 327 which supports a pair of oppositely oriented hinge fittings 329, typically as a pair of oppositely disposed apertures. A pair of oppositely directed hinge projections 331 are integral with a sprinkle cover 333 which presents an outwardly curved multi aperture member. This enables the sprinkle cover 333 to be folded back into "butterfly style" held-open position where a user wants the sprinkle function disabled, and out of the way of a more open flow.

The arched handle 315 may preferably be hollow both to provide additional storage capacity especially at the rear of the applicator 301, but also at the front of the applicator 301 adjacent the dividing zone 311. The front of the applicator 301 adjacent the dividing zone 311 also serves as a source of displacement air so that as the applicator 301 is righted, all of the balancing air need not come from back as being pulled through the sprinkle cover 333.

Adjacent the large top opening 305 a vertical feature is seen as a spout guide 339. This structure is attached, preferably permanently, about a position adjacent and around a rim 341 of the large top opening 305. It may be riveted with rivets 343 either to the material of the applicator 301, or back onto its own material where provided to hook around the rim 341.

The spout guide shown is designed to allow material to run out a bottom 345 of a ramp not completely seen in FIG. 10 and over a face 347 of a fitting 349 through which extends the rivet 343.

On either side of the ramp, and again the full extent of the ramp is not seen in FIG. 10, are a pair of tall vertical projections 351 and 353 which lie to either side of and displaced slightly from a manual pump 355 having a spout 357. A portion of spout 357 is obscured behind the projection 351. The manual pump 355 is threadably attached to the top of the integral concentrate container 303.

When the integral concentrate container 303 is placed in its accommodation space (to be more fully shown later), the spout 357 is simultaneously fitted into a position between the pair of projections 351 and 353 as the integral concentrate container 303 is being fitted into place.

Once in place, the position of both the integral concentrate container 303 and the projections 351 and 353 are such that the manual pump 355 spout 357 is not free to turn either way. The manual pump 355 may be actuated upwardly and downwardly by having the user press onto the top of the manual pump 355 in a deliberate manner. However, the manual pump 355 and spout 357 are protected from any generalized downward striking motion by the protection afforded by the projections 351 and 353.

Where the manual pump 355 and spout 357 structures are upwardly spring loaded, they will return to their upper position as is seen in FIG. 10. Where no spring loading is present, the manual pump 355 and spout 357 may be left in a downward position (not shown in FIG. 10) to provide even more protection against downward actuation. However, since most pump assemblies available commercially are spring loaded to assume an upward, ready-to-pump orientation, the projections 351 and 353 will be of especial value in providing coverage against inadvertent actuation when the manual pump 355 and spout 357 are in the upward position.

Further, the projections 351 and 353 provide a "locked in" guide which keeps the spout 357 in line and directly toward the large top opening 305.

Reasonably non-destructive removal of the spout 357 from between the projections 351 and 353 can effectively be accomplished by removal of the integral concentrate container 303 from the applicator 301. Conversely, and as can be seen in FIG. 10, the integral concentrate container can be loaded in a different orientation with the spout 357 not between the projections 351 and 353 so that reasonable care to load the integral concentrate container 303 into the applicator 301 should be exercised. The flared entrance to the space between the projections 351 and 353 facilitates the guiding of the spout 357 upon loading of the integral concentrate container 303 into the applicator 301.

In terms of metering, the use of a guarded system provided by the projections 351 and 353 prevents unintended actuation while also facilitating the use of manual pumps 355 with different metering capability. For a given neck size or metering plunger area, metering limits are typically set by limiting the vertical height over which manual pump 355 can travel. A small metered flow would be accomplished by providing a manual pump 355 which might have only a quarter inch stroke from the top of its travel path to the bottom. In this case it would reside only in the lower area between the projections 351 and 353. Since the projections 351 and 353 have a flared opening, it is not necessary for a high clearance of the spout 357 over the projections 351 and 353. Manual pumps similar to manual pumps 355 of any operating height may be utilized in conjunction with the projections 351 and 353.

Also seen is a base collar 359 of the manual pump 355 which further illustrates the advantages of the two projections 351 and 353 as a system which provides significant clearance for a wide variety of fittings or base collars 359 of a manual pump 355. Further, in terms of a stabilizing force, note that arched handle 315 is not only attached adjacent two dividing zones 311, but also by attachment arm 361 at the more forward end of the applicator 301 and by attachment arm 363 at the more rearward end of the applicator 301. Both the attachment arms 361 and 363 attach the arched handle 315 to the upper sides of the upper reservoir portion 307. Preferably, but not required, is the presence and hollow nature of the arched handle 315 and its communication with the upper reservoir portion 307 as well as the expanded base reservoir portion 309 at its two points of attachment adjacent the dividing zone 311. This enables the arched handle 315 to hold additional water on a level with water in the higher of the upper reservoir portion 307 and expanded base reservoir portion 309 when the applicator 301 is tilted. In essence, expanded water holding capability combines with stability. In addition, displacement air can also readily flow through the arched handle 315 especially from its connection with the upper reservoir portion 307.

Figure 11:
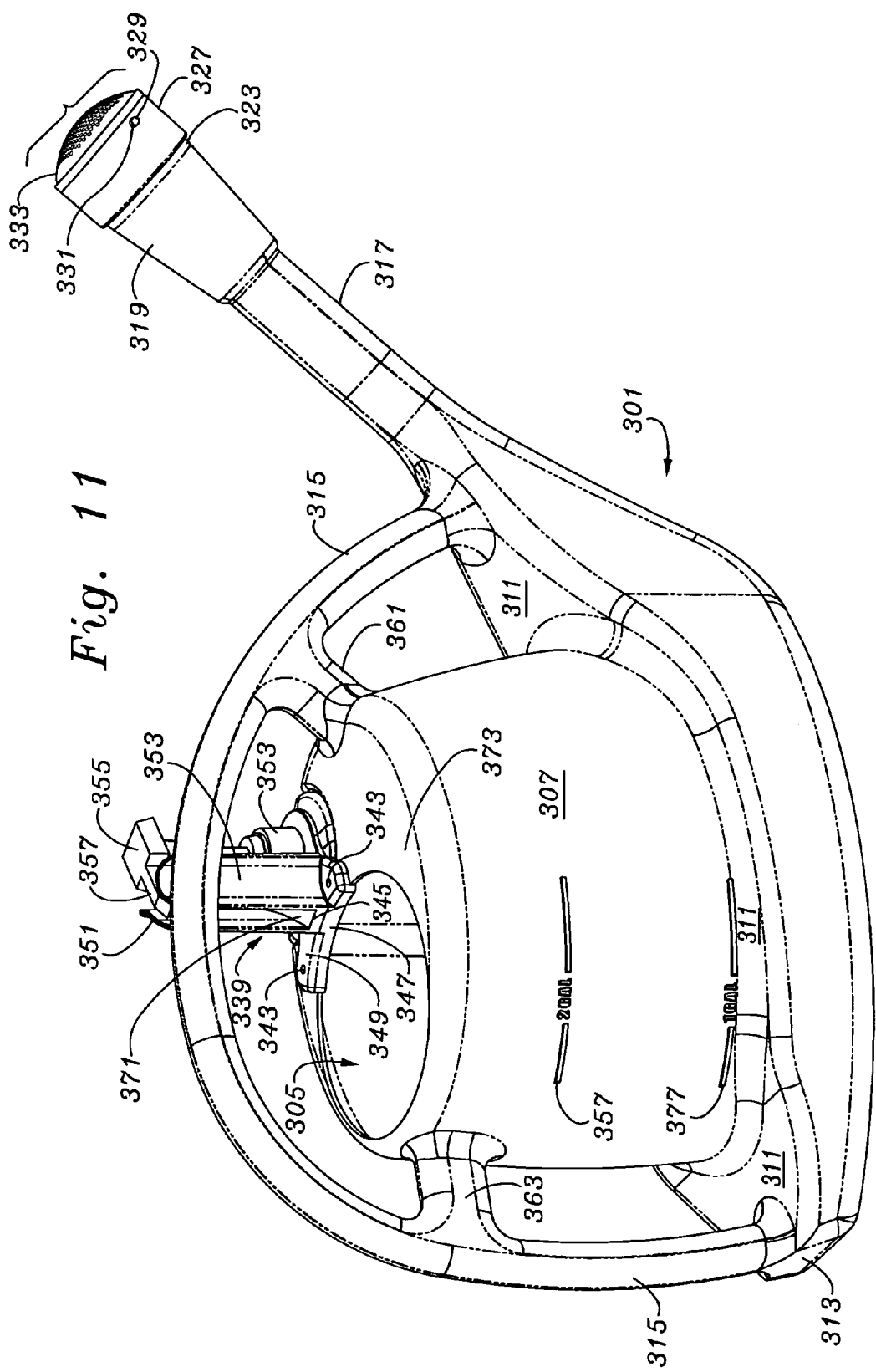
FIG. 11 is a right rear perspective view of the second embodiment of a gravity type applicator as seen in FIG. 10.

Referring to FIG. 11, a perspective view of the other side of the applicator 301 illustrates a better view of the face 347 of the spout guide 339. Now, above the bottom 345, a curved ramp 371 can be seen. The geometry seen in FIG. 11, combined with that of FIG. 10 helps to complete an understanding of the flow of concentrate after it leaves the end of the spout 357. The concentrate drops onto the ramp 371 to flow over the face 347, and through the large top opening 305 into the upper reservoir portion 307. The general configuration of the fitting 349 illustrates a construction that is self contained, and prevents any dispensed concentrate from entering any space between the fitting 349 and an upper surface 373 of the upper reservoir portion 307. Further, the ramp 371 will be continually washed with fresh amounts of concentrate, of any type, and should generally operate to keep itself clean. Clearing water can also be introduced down the ramp 371 on each subsequent filling of the applicator 303 to keep it clean.

Notice also that gross volume measurement level marks are present, including a volume mark 375 to indicate a two gallon level and a volume mark 377 to indicate a one gallon level. Further volume marks can be supplied both on the upper reservoir portion 307 and farther down on the expanded base reservoir portion 309 where necessary. However, given the precision metering ability of the manual pump 355 and the more precise level measurement of concentrate from the concentrate container 303, the user will be able to control the concentrations accurately without having smaller denomination measurements on the applicator 303 housing.

Referring to FIG. 12, an expanded view of the integral concentrate container 303 being removed from the gravity type applicator 301 illustrates further details thereof. The integral concentrate container 303 is seen as having a front face 381 separate from the outer surface of the upper reservoir portion 307. An upper surface 383 reveals that the integral concentrate container 303 has a "D" shaped cross section which includes a curved surface 385 which extends in a continuous curve from a left to rear to right side smoothly.

This curved rear portion of its cross sectional shape allows the integral concentrate container 303 to fit into a compartment 391 which includes a floor surface 393, a curved transition surface 395 and leading to a generally vertical, curved rear surface 397. At the top of the compartment 391 a portion 399 of the upper surface 373 comes forward in a thin "U" shape to engage a mating surface located just below the base collar 359.

A series of relationships can be used to keep the integral concentrate container 303 securely carried within the compartment 391. These can include for example making floor surface 393 slightly lower than an edge 401, or adjusting the portion 399 so that it works in conjunction with the floor surface 393 to "trap" the container 303, such as by being able to be deflected upwardly.

Another mechanism is also shown in FIG. 12. A member 405 is seen on the integral concentrate container 303 which may be either a projection or a depression. Member 405 is positioned to complementarily contact a member 407 on the inside of the generally vertical, curved rear surface 397. Member 407 is the other of a projection or depression and enables a hold in fit with the member 405. The fit relationship can be snap, interference, latch, spring powered and the like or have a further relationship.

Also seen is the extension of the curved edge 401 along an extent adjacent both the floor 393 and upward along both sides adjacent to the generally vertical, curved rear surface 397. The curvature of the edge can be severe or gentle to facilitate handling by increasing or decreasing the ease with which the human hand can grasp the integral concentrate container 303. The "D" shaped curved surface 385 has a tighter radius of curvature at its rearmost extent to facilitate the rapid, easy loading of the integral concentrate container 303 into the compartment 391. The integral concentrate container 303 can be, depending upon the details of orientation, loaded by angling the bottom in first or by first positioning the base collar 359 with respect to the portion 399 followed by pushing the bottom of the integral concentrate container 303 into place. In some configurations integral concentrate container 303 may be loaded in with a vertical orientation. Removal of the integral concentrate container 303 can be accomplished by grasping and pulling outwardly on the base collar 359.

Front face 381 of the integral concentrate container 303 is shown as being marked with volumetric indicator marks 411. Near the bottom of the integral concentrate container 303, the front face 381 has an outward curvature 413 followed by a downward curvature 415 leading to a forwardly displaced vertical portion 417. However, the integral concentrate container 303 need not have the exact shape details seen in FIG. 12. Integral concentrate container 303 can also have manual assists for instances where it needs to be changed more quickly or more often.

Referring to FIG. 13, a side view of the integral concentrate container 303 is seen, without the manual pump 355 and with the base collar 359 removed to expose an upper neck 421 having a simple thread 423.

Referring to FIG. 14, a top view of the integral concentrate container 303 again shows the upper neck 421 as having an opening 425. The curved surface 385 is shown as having about 180° of curvature having an even radius about the upper neck 421. The 180° of curvature levels into a flat portion 427 and a flat portion 429 identifiably seen for the first time in FIG. 14.

Referring to FIG. 15, a further embodiment of a pressurized applicator is seen as integrated pressurizable applicator 501. Applicator 501 has a body 503 having an integral internal reservoir (not shown in FIG. 15) and a concentrate container system 505 which includes a concentrate container 507, neck unit 509 and a pump unit 511 of which can be seen a collar 513, pump head 515 and spout 517.

Above the collar 513 and also mounted above the body 503 is a potentially removable drainage basin 521. Drainage basin 521 can be seen to act to prevent any downward motion on the pump head 515 by virtue of interference of the spout 517 with the drainage basin 521. Only when the spout 517 is directed over the entrance, which is occupied by a pressurizing unit 523 in FIG. 15, will the pump head 515 have the ability to be depressed freely. Even where the spout 517 is not directly over the opening into the integral internal reservoir (not shown in FIG. 15), any dispensed concentrate will drain into such opening, assisted by the drainage basin 521. An upper edge 525 of the drainage basin 521 radially and blockingly "tracks" the spout 517 throughout the portion of its radial pivot ability when it is not nearest the area within the drainage basin 521 which is shown in FIG. 15 to be occupied with the pressurizing unit 523.

The radial distance of the upper edge 525 is seen to engage the spout 515 between its plunger 527 and spout tip 529. It is to be emphasized that upper edge 525 may have a radially expanded distance to simply catch any drips from the spout 517 to direct those drips to the center opening (not shown in FIG. 15), or the spout 517 may have a reduced radial distance. In this case, the height of the upper edge 525 may be increased to block generally all but deliberate access to the pump head 515. In an alternative configuration the height of the pump head 515 may be lowered, relative to the upper edge 525, to further prevent inadvertent dispensing of concentrate. The rim 525 of the drainage basin 521 has an expanded radius portion surrounding the pressurizing unit 523 of which the pump handle 523 is visible in FIG. 15.

Also seen extending to one side of the body 503 is a hose connection 531. Drainage basin 521 is also seen as having a lower collar 533 which may form a partial or total support for the drainage basin 521. A safety relief valve 535 is also seen on the body 503.

Concentrate bottle 507 is shown as being supported by a shelf extension 541 extending from a lower portion of the body 503. Structures to be shown will illustrate some possible structure to assist holding concentrate bottle 507 in place. Also seen is an indented area 543 which defines the body 503 legs or stability projections.

Referring to FIG. 16, a partially exploded view of the integrated pressurizable applicator 501 is shown with the concentrate container system 505 in a removed and exploded position. The concentrate container 507 is seen as a generally cylindrical container having an upper opening 555 surrounded by threads 557 on a circumferentially indented land 559. From the land 559 the sides of the concentrate container 507 is generally linearly cylindrical, terminating in a curved transition 561 to a flat bottom 563. A rim 565 exists at the top of the land 559 which is preferably enabled to accept a sealing member (not shown) and which is to be further illustrated with respect to a concentrate system.

A sealing member will preferably be of the type which adheres to an upper rim and which can be either punctured or peeled away. As will be shown, the integrated pressurizable applicator 501 utilizes a concentrate container system 505 which minimizes human contact with the concentrate and minimizes spillage. In the configuration shown, the puncturing of any covering seal will occur at its center due to the generally concentric nature of the concentrate container system 505.

The neck unit 509 has a set of internal threads adjacent its underside for engagement with threads 557 of the concentrate container 507. Neck unit 509 extends upwardly to a land 569 having threads 571. Land 569 has an opening 573 at its upper end. The neck unit 509 acts as an adapter to the concentrate container 507, and can differ as needed to accommodate different configurations of pump sets having different connection fittings. In the alternative a single solid container can be utilized.

To the right of the neck unit 509 and concentrate unit 507 is a pump set 575 which includes a boss 577 above the collar 513, and a main housing 579 below the collar 513. Below the main housing 579 is a pickup tube 581 having a lower end 583 which is cut at an angle to form a sharp tip. Also seen is the fact that the plunger 527 extends down into the boss 577.

The concentrate container 507 is seen to fit into a curved space 585 formed by a portion of the outside of the body 503. Space 585 has a projection 587 which engages an indentation (not shown) on the concentrate container 507. The curved space 585 leads down to a shelf 589 which supports both the concentrate container 507 and an upward button protrusion 591, which similarly fits into a small indentation (not shown) on the concentrate container 507. Each of the members including projection 587 and upward button protrusion 591 limit the movement of the concentrate container 507 out of the curved space 585 by providing a general orthogonal entry into the body of the concentrate container 507.

Changing of the concentrate container 507 is had by bringing the bottom outward and over the relatively low height upwardly projecting button protrusion 591. The more upwardly located connection with the projection 587 enables a reduced removal angle. Removal can be completed by either having the pump set 575 lowered and angled out so that the spout 517 can clear an opening (not yet shown) in the drainage basin 521. In the alternative, the collar can be threadably removed from the threads 571 by turning the boss 577 from within the drainage basin 521 to remove the pump set 575. After removal of the pump set 575, the empty concentrate container 501 with its attached neck unit 509 can be can be removed by either urging the bottom or the top of the concentrate container 507 laterally away from the body 503.

Referring to FIG. 17, a sectional view of the integrated pressurizable applicator 501 is seen. The details of the pressurizing unit 523 are not shown beyond the partial and slight detail of the handle shape. Typically this pressurizing unit 523 threadably disengages internally from a neck 597 of the body 503 by turning the handle seen at the top of pressurizing unit 523 from either a locked position or a position of maximum angular displacement in one direction. In the unlocked (or un-threaded in the case of a threaded hold down) position, a handle is usually free to be raised and lowered to introduce pressure into a reservoir 599.

As can be seen, the neck 597 forms an anchor to which the lower collar 533 is attached. Attachment may be by close fit, pin lock, gluing or any other acceptable method. In some of these methods, the drainage basin 521 may be removable. In the configuration shown, the locking down of the pressurizing unit 523 also causes the drainage basin 521 to be locked down and otherwise supported.

To the right of the lower collar 533, the drainage basin 521 can be seen to have an opening 601 through which the boss 577 of the pump set 575 is seen to immediately extend. Depending upon the size of the pump head 515, it is possible to angle the concentrate container 507 away from the body 503 with the drainage basin 521 still in place, and allow the plunger 527 to pass downwardly through the opening 591 without having to disconnect the pump set 575 from the concentrate container 507. The ability and desirability to do this may depend not only on the overall size of the pump head 515, but also the height and diameter of the material surrounding the opening 601. Further, the material surrounding the opening 601 can be adjusted to engage the boss 577 or even the top of the collar 513 to provide further support to the drainage basin 521.

As can be further seen, the concentrate container 507 is held in place by the projection 587 extending into an indentation 605. Similarly, upward button protrusion 591 is seen protruding into an indentation 607 located at the bottom center of the concentrate container 507 and located at the center of generally flat bottom 563.

Referring to FIG. 17, a more complete exploded view of the concentrate container system 505 illustrates some of the flexibility involved with the use of a wide mouth concentrate container 507 along with a neck unit 509. As can be seen, the wide mouth concentrate container 507 may be supplied with a sealing plastic or foil or other thin planar sealing member 621 which engages the upper rim 565 of the circumferentially indented land 559. Above the foil member 621, and as an option, a reinforcement ring 623 having a smaller central aperture 625 is seen. The reinforcement ring 623 is especially useful for concentrating any puncturing forces from the pickup tube 583. Concentration of puncture forces will prevent lateral wide tearing of the foil member 621, and will prevent stretching of the surrounding areas of the foil member 621. This can be particularly important if some sealing is desired around the pickup tube 583. The reinforcement ring 623 smaller central aperture 625 gives the ability to (1) concentrate puncture area, (2) concentrate puncture forces, (3) limit tearing to a small area, and (4)

provide some sealing about the pickup tube 583. The reinforcement ring 623 can be made of flexible material to further accomplish this task.

Above the neck unit 509, a smaller diameter sealing plastic or foil or other thin planar sealing member 631 is seen. Where a small area of material is provided, and depending upon the selection of material, a similarly small reinforcement ring 623 can be eliminated. The user can be supplied with a bottle having the dimensions of the combined concentrate container 507 and neck unit 509 or the user can be supplied with a simple concentrate container 507, especially sealed with a foil member 621 and optional reinforcement member.

It is believed that where a liquid bottle is supplied, a single bottle with a small opening 573 would be desirable. Where a powder or dehydrated mixture is supplied, the concentrate container 507 may be supplied alone. This may include the case where water or other fluid is added to an un-dissolved powder. In both cases the system provides maximum flexibility to users, manufacturers, and concentrate suppliers.

Referring to FIG. 19, a further embodiment is seen as a gravity type applicator 651 which has features which are more centered and vertically oriented. A concentrate container 653 is seen a separated from the gravity type applicator 651. Concentrate container 653 is vertically taller and thus has a little additional volume capability for a given set of other dimensions.

The floor surface 393 and generally vertical, curved rear surface 397 seen in gravity type applicator 301 is replaced by a pure vertical axis horizontal indentation 655 which may have no floor surface. A single projection 657 is seen extending from a point generally near the middle of the horizontal indentation 655 and matches bore 659 shown in phantom at the rear of the concentrate container 653. Aside from support had just below the base collar 359, the bore 659 connection with the projection 657 provides the only other support for the concentrate container 653. Note also that the concentrate container 653 has been located more rearwardly than the position of concentrate container 303 with respect to gravity type applicator 301. This offers different advantages of enabling user contact directly with the bottom of the concentrate container 653, as well as a more centered center of gravity profile.

Projection 657 is seen as being cylindrical, but need not be. Projection 657, as well as bore 659, can be angled upwardly to obtain a better hold on the concentrate container 653. Further, the projection 657/bore 659 holding system can be supplemented by other holding structure possibly in conjunction with other structures.

In addition, a matching one piece holding and flow directing structure 661 is provided which includes a curved portion 663 and an enclosed guide structure 665 having a side opening 667. The enclosed guide structure 665 has a bottom opening (not shown) preferably with a sleeved extension extending through a matching opening in a top surface 671 upon which the guide structure 665 is mounted. This enables dispensed concentrate to fall directly into the inside of the upper reservoir portion 307 to further eliminate surfaces, especially surfaces which are slightly horizontal which might come into contact with, and delay the entry of concentrate. The entry of the spout 357 into the opening 667 is by a slight turning motion, similar to that seen in gravity type applicator 301. The flow directing structure 661 provides a more protected structure to both guard against inadvertent actuation as well as some added degree of isolation of the concentrate. Rivets 675 are seen holding the flow directing structure 661 atop the top surface 671.

A more compact sprinkle screen assembly 681 is seen having a housing 683. Referring to FIG. 20, a view of the detached compact sprinkle screen assembly 681 is seen having a cover 685 having side pinned projections 687. The cover 685 has a series of holes 689 to enable a sprinkles flow when the cover 685 is rotated to a covering position within the housing 683. The wall thickness of the cylindrical portion 323 should ideally be thin enough to insure that the cover 685 swings freely open. Detent notches both forwardly and rearwardly adjacent the housing 683 near the pinned projections 687, will enable the cover 685 to be held in the open position.

Referring to FIG. 21, a side perspective view of a gravity type applicator 701 has a few additional features of note. At the left, a gravity type applicator 701 is seen to have a recessed sprinkle screen assembly 703 to provide additional protection for the sprinkle cover 685. A matching one piece holding and flow directing structure 705 includes a neck reinforcement partially surrounding boss 707 to provide a more strengthened lock between the base collar 359 and top of a concentrate container 711. The terminations of the boss 707 are wedge shaped which enable the gap between the base collar 359 and top of a concentrate container 711 to be used to mount it on the wedge shaped boss 707 to get a good lock on the holding of the concentrate container 711.

The concentrate container 711 includes a pair of wedge shaped projections 713 near its base, one of which is seen in FIG. 1. The wedge shaped projections 713 slip past a matching pair of interference structure projections (not shown in FIG. 21) on the inside of the vertical axis horizontal indentation 655. The wedge shape of the projections 713 assist in ease of locking and in maintaining the concentrate container 711 into place. As before, the spout 357 of the manual pump 355 is guided into the side opening 667 as the concentrate container 711 is loaded onto the matching one piece holding and flow directing structure 705. Also note that as a variation, a set of volumetric indicator marks 717 are located on the side of the concentrate container 711.

Referring to FIG. 22, a further variation on the matching one piece holding and flow directing structure 705 is shown. A unitary combination matching one piece holding, rim and flow directing structure 721 is shown in exploded view over the gravity type applicator 701 seen in FIG. 21. The combination matching one piece holding, rim and flow directing structure 721 may be particularly advantageous for cases where the large top opening 305 is not as finished as would be desired or where the top opening 305 needs to be utilized for additional stability.

The unitary combination matching one piece holding, rim and flow directing structure 721 has a downwardly directed flange 723 which fits into the opening 305 which helps to stabilize and register the unitary combination matching one piece holding, rim and flow directing structure 721. A pair of apertures, including the aperture 725 which is seen on the unitary combination matching one piece holding, rim and flow directing structure 721 are used to hold it in place. With the additional stabilization of the flange 723, a lesser number of apertures may be necessary. A pair of apertures 727 are seen on the upper surface 671 of the gravity type applicator 701 which align wit the apertures 725.

In FIG. 22, one of two vertical projections 731 are seen just inside the lower extent of the vertical axis horizontal indentation 655.

Referring to FIG. 23, a sectional view taken along lines 23—23 of FIG. 21 shows a recessed sprinkle screen assembly 703 which is oriented to open by pivoting in one direction only. A cover 741 has water flow apertures 743 and is mounted to pivot adjacent an interference projection 745. On one side of the pivot of the cover 741, an inside portion of the recessed sprinkle screen assembly 703 is provided as a sweeping surface 751, so that the cover 741 will sweep toward the main body of the gravity type applicator 701. At the other side of the pivot of the cover 741, an inside portion of the recessed sprinkle screen assembly 703 includes a stop lip 753 which prevents motion of an abutting portion of the cover 741 from movement in the direction of the gravity type applicator 701.

By providing movement in one direction only, a closer tolerance can be provided to enable the cover 741 to become more easily fixable in the open position. The interference projection 745 is used to keep the cover 741 in the open position. It is preferable to mark the cover 741 to indicate the direction of movement by pressing the side of the cover 741 nearest the sweeping surface 751. Further, an extended forward portion of the housing of the recessed sprinkle screen assembly 703 provides additional protection for the cover 741 when it is in the open position.

Further, the flexibility for sealing will provide manufacturers and users with new options for recycling. By standardizing the containers in a way which maximizes their usage, recycling is facilitated. Recycling includes cleaning, re-filling with more concentrate and re-selling. The concentrate container system 505 also facilitates the use of colors to identify different types of concentrate.

While the present invention has been described in terms of a system for providing convenient metered concentrate with respect to a dilute dispenser system, the principles contained therein are applicable to other types of systems.

Although the invention is derived with reference to particular illustrative embodiments, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. An applicator comprising:
    a body having a main reservoir having upper reservoir portion and a base reservoir portion extending peripherally beyond said upper reservoir portion for stability, said base reservoir portion having a forward end having a spout portion and a rearward end, an opening leading to said main reservoir for holding a diluted mixture of a concentrate and a diluent, an arched handle extending from said rearward end of said base reservoir portion over said upper reservoir portion and to said forward end of said base reservoir portion;
    a concentrate container selectively removable from said body having a containment volume, supported by said body and having a metering device in communication with said containment volume, said metering device selectively oriented to meter said concentrate through said opening and into said main reservoir, said container supporting a circumferentially reduced diameter land supporting a boss having a first set of threads surrounding a first open end;
    a neck unit having a first open end and a second open end having a second set of threads circumferentially inwardly disposed and threadably engageable with said first set of threads, said first end of said neck unit for engaging with a pump set.

2. The applicator of claim 1 wherein said main reservoir delivers said diluted mixture through said spout portion and under the influence of gravity.

3. The applicator of claim 1 wherein said concentrate volume container has an external surface generally continuous with an external surface of said body when said container is supported by said body.

4. The applicator of claim 1 wherein said concentrate volume container is made of at least one of clear and light dispersive material which gives an external indication of a liquid level within said concentrate volume container through a wall of said concentrate volume container.

5. The applicator of claim 1 wherein said concentrate volume container is colored in order to facilitate the use of multiple ones of said container to contain different concentrates readily identifiable by such coloration.

6. The applicator of claim 1 wherein said metering device includes a spout and wherein said applicator further comprises a spout guide for surrounding and protecting said spout from inadvertent actuation.

7. The applicator of claim 1 wherein said concentrate container includes at least one of an indentation and a projection and wherein said body has the other of an indentation and a projection, complementary to said at least one of an indentation and a projection of said concentrate container to assist in supporting said concentrate container with respect to said body.

8. The applicator of claim 1 and further comprising a thin planar sealing member fitted on at least one of said first open end of said cylindrical container and said first open end of said neck unit.

9. The applicator of claim 8 and wherein said metering device further comprises a pump unit having a main housing having a first end for slidably accepting a plunger and a second end supporting a pickup tube extendable through at least one of said first open end of said cylindrical container and said first open end of said neck unit.

10. The applicator of claim 1 wherein said concentrate volume container has an external surface partially behind and covering a portion of an outwardly external surface of said body when said container is supported by said body.

11. The applicator of claim 1 wherein said metering device is a manually operated pump.

12. The applicator of claim 1 wherein said arched handle is hollow and in fluid communication with said main reservoir to help stabilize weight distribution of said applicator when said applicator is tilted.

13. The applicator of claim 12 wherein said annular body includes a sweeping surface on one side of said annular body to accommodate radiused movement of one side of said sprinkle screen cover.

14. An applicator comprising:
    a body having a forward end having a sprinkle screen assembly movable between a first position within a channel where fluid travels through said sprinkle screen assembly to a second position within said channel where fluid travels adjacent either side of said sprinkle screen assembly, said body having an opening leading to a main reservoir for holding a diluted mixture of a concentrate and a diluent, an arched handle extending from said rearward end over said body to said forward end and wherein said main reservoir delivers said diluted mixture through a tube and under the influence of gravity and wherein said main reservoir further comprises an upper reservoir portion and an expanded base reservoir portion in fluid communication with said upper reservoir portion, where said expanded base reservoir portion includes a portion of said main reservoir, for stability;

a liquid concentrate volume containment, having a containment volume, supported by said body and having a liquid metering device in communication with said containment volume, said metering device selectively oriented to meter said concentrate through said opening and into said main reservoir.

15. The applicator of claim 14 wherein said sprinkle screen assembly further comprises an annular body supporting a sprinkle screen cover pivotable within said annular body.

* * * * *